(12) United States Patent
Smith (10) Patent No.: US 9,884,426 B2
(45) Date of Patent: Feb. 6, 2018

(54) BOOM UTILIZED IN A GEOMETRIC END EFFECTOR SYSTEM

(71) Applicant: Delaware Capital Formation, Inc., Wilmington, DE (US)

(72) Inventor: John Smith, Streetly (GB)

(73) Assignee: DE-STA-CO Europe GmbH, Oberursel (DE)

( * ) Notice: Subject to any disclaimer, the term of this patent is extended or adjusted under 35 U.S.C. 154(b) by 215 days.

(21) Appl. No.: 14/299,297

(22) Filed: Jun. 9, 2014

(65) Prior Publication Data

US 2015/0003947 A1 Jan. 1, 2015

Related U.S. Application Data

(60) Provisional application No. 61/840,135, filed on Jun. 27, 2013.

(51) Int. Cl.
| | |
|---|---|
| *B25J 15/00* | (2006.01) |
| *B25J 9/18* | (2006.01) |
| *B23P 19/10* | (2006.01) |
| *B25J 13/08* | (2006.01) |
| *B25J 9/00* | (2006.01) |
| *B25J 18/00* | (2006.01) |

(52) U.S. Cl.
CPC ............ *B25J 13/085* (2013.01); *B25J 9/0012* (2013.01); *B25J 15/0061* (2013.01); *B25J 18/00* (2013.01); *B25J 15/00* (2013.01)

(58) Field of Classification Search
CPC . B25J 13/00; B25J 13/085; B25J 18/00; B25J 15/00; B25J 15/061; B25J 19/0012
USPC ....... 248/542, 276.1, 346.06, 548, 550, 592, 248/904; 600/130, 407, 410, 425; 606/130; 318/568.11
See application file for complete search history.

(56) References Cited

U.S. PATENT DOCUMENTS

| | | | |
|---|---|---|---|
| 4,503,416 A | 3/1985 | Kim | |
| 6,236,906 B1 | 5/2001 | Müller | |
| 6,703,766 B2 | 3/2004 | Duerr | |
| 6,815,037 B2 | 11/2004 | Ooshima et al. | |
| 7,086,293 B2 | 8/2006 | Heiligensetzer et al. | |
| 7,459,215 B2 | 12/2008 | Miller et al. | |

(Continued)

FOREIGN PATENT DOCUMENTS

| | | |
|---|---|---|
| DE | 10063030 | 9/2002 |
| DE | 202009008994 | 12/2010 |

(Continued)

OTHER PUBLICATIONS

"EQAT Interactive Tooling Catalog v1.5", retrieved from the Internet: URL:http://www.norgren.com/automationsolutions/downloads/download/23/robot_end_of_arm_tool_eoat_interactive_catalog; Apr. 25, 2013, 118 pages.

*Primary Examiner* — Tan Le
(74) *Attorney, Agent, or Firm* — Harness, Dickey & Pierce, P.L.C.

(57) ABSTRACT

A boom has a cylindrical body with a coupling flange at each end. The body is manufactured from a carbon fiber material. During construction of the carbon fiber body, an electronic feedback mechanism is embedded into the carbon fiber. The electronic feedback mechanism may be a simple electronic strain gauge. Optionally, the feedback mechanism may include a fiber optic cable woven into the carbon fiber weave.

6 Claims, 6 Drawing Sheets

(56) References Cited

U.S. PATENT DOCUMENTS

| | | |
|---|---|---|
| 7,602,306 B2 | 10/2009 | Kashio et al. |
| 7,707,893 B2 | 5/2010 | Johansson et al. |
| 7,826,984 B2 | 11/2010 | Sjöstrand et al. |
| 7,871,705 B2 | 1/2011 | Miller et al. |
| 8,090,475 B2 | 1/2012 | Blanc et al. |
| 8,396,596 B2 | 3/2013 | Oka et al. |
| 8,621,939 B2 | 1/2014 | Blumenkranz et al. |
| 8,649,906 B2 | 2/2014 | Bischoff et al. |
| 2008/0012517 A1* | 1/2008 | Kniss ............... B25J 19/065 318/568.11 |
| 2008/0140321 A1 | 6/2008 | Blanc et al. |
| 2008/0247857 A1 | 10/2008 | Yuasa et al. |
| 2009/0248038 A1* | 10/2009 | Blumenkranz ........ B25J 13/085 606/130 |
| 2011/0118751 A1* | 5/2011 | Balaji ................ A61B 17/32 606/130 |
| 2011/0160745 A1* | 6/2011 | Fielding ............ A61B 19/2203 606/130 |
| 2012/0071893 A1* | 3/2012 | Smith ............... A61B 17/1664 606/130 |

FOREIGN PATENT DOCUMENTS

| | | |
|---|---|---|
| EP | 2116339 | 11/2009 |
| JP | 2009-160685 | 7/2009 |

* cited by examiner

BOOM UTILIZED IN A GEOMETRIC END EFFECTOR SYSTEM

CROSS-REFERENCE TO RELATED APPLICATION

This application claims the benefit of U.S. Provisional Application No. 61/840,135, filed on Jun. 27, 2013. The entire disclosure of the above application is incorporated herein by reference.

FIELD

The present disclosure relates to geometric end effector systems used on a robot and, more particularly, to a boom end effector that has integral sensing technology.

BACKGROUND

End effectors for use in assembly systems have been known in the prior art for many years. Generally, in many automated assembly systems, devices are used for holding and placing components and parts in a specified place so that a manufacturing, finishing or other intermediate step can be performed on the product being assembled or worked upon. These automated assembly systems generally employ many robots that minimize or eliminate the need for manual intervention, thus reducing the cost to the manufacturer of the labor and parts involved. The components used and made in such automated systems are typically made or moved by a robot via an arm or wrist all of which are well known methods in the prior art. Some of these methods may include having an end effector attached to the end of a robot arm and acquires a particular part. The end effector then either releases the part during the work or holds the part steady in a pre-specified position during the actual operation on the part. Other methods include using the robot arm or wrist to hold a tool to actually perform work on a part that is being held by other robots or other components in predetermined positions.

Also, U.S. Pat. No. 7,609,020, issued Oct. 27, 2009 and U.S. Pat. No. 7,940,023, issued May 10, 2011, both entitled "Geometric End Effector System", the specification and drawings of which are expressly incorporated by reference, illustrate an improved modular geometric end effector system that proposes a cost effective method of replacing and repairing each component connected to a robotic cell on the end effector of a robotic arm, wrist or the like. While this type of system utilizes a breakaway column system, it is not possible to determine the stress and strain on the particular end effector. Thus, it would be desirable to gain electronic feedback on the status of the jig, fixture or end effector built with the system. Also, it would be desirable to allow the jigs, fixtures or end effectors to become an add on system that, if possible, can determine if the operations are proceeding as normal or are not normal.

The present disclosure provides the art with such a device. The present disclosure provides electric feedback as to the status of the jig, fixture or end effector built into the system. Also, the boom enables jigs, fixtures or end effectors to become an add-on system capable of processing whether or not the operations are being conducted satisfactorily or if the operation is not normal.

SUMMARY

According to an aspect of the disclosure, a boom comprises a cylindrical body including a coupling flange at each end. The body is manufactured from a carbon fiber material. During construction of the carbon fiber body, an electronic feedback mechanism is embedded into the carbon fiber. The electronic feedback mechanism may be a simple electronic strain gauge. Optionally, the feedback mechanism may include a fiber optic cable woven into the carbon fiber weave.

Accordingly to a second aspect of the disclosure, a geometric end effector system comprises a platform with a frame secured to the platform. A plurality of bases is arranged at predetermined positions on the frame. An anchor mount is secured to at least one of the bases. A component connects to the anchor mount. The component includes a boom. The boom includes a cylindrical body including a coupling flange at each end. The body is manufactured from a carbon fiber material. During construction of the carbon fiber body, an electronic feedback mechanism is embedded into the carbon fiber. The electronic feedback mechanism may be a simple electronic strain gauge. Optionally, the feedback mechanism may include a fiber optic cable woven into the carbon fiber weave.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

FIGS. 1 through 5 show one contemplated embodiment of the geometric end effector system 10 according to the present invention. The end effector system 10 includes a platform 12 that is preferably made of steel, however it should be noted that any other type of metal, plastic, ceramic, or composite may be used for the platform 12. The platform 12 will have a variety of orifices therethrough to mate with any of the known robotic arms, robotic wrists or the like. The platform 12 may be of any known shape, such as a plate with the orifices therethrough, a circular, square, triangular, or any other shaped plate or any other type of platform known to connect to the end of a robot. The platform 12 is attached by any known fastening technique, i.e., chemical, mechanical or the like to a frame 14 which is preferably made of a steel material. However, it should be noted that the frame 14 may be made of any other known material such as any other known metal, plastic, ceramic, composite, natural material or the like. The frame 14 may have any known shape. The shape will depend on the environment in which the robotic cell will be used. The frame 14 will allow for a plurality of components to be connected thereto such that one robot arm may perform several functions or hold complex geometric parts for operations thereon or movement between stations in a manufacturing environment.

Figure 1:
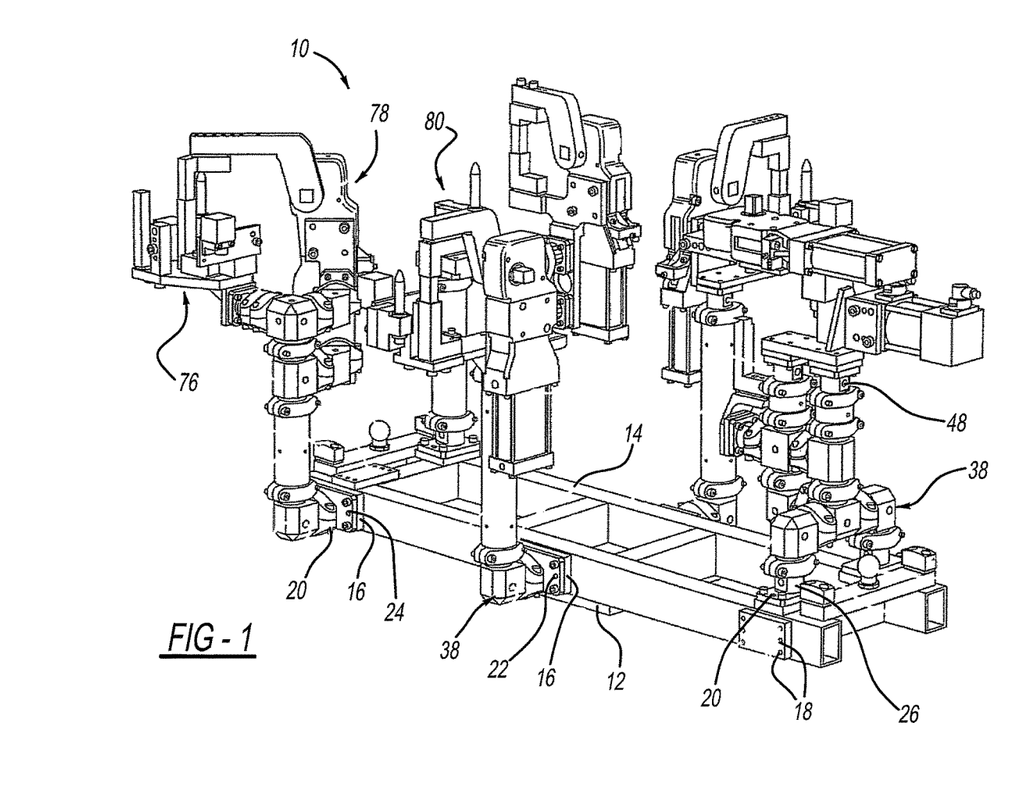
FIG. 1 is a perspective view of a geometric end effector system.

Each frame 14 will have a plurality of base members 16 secured thereto. The base members 16 are secured to the frame 14 by any known mechanical or chemical bonding technique such as welding, fastening or the like. Each of the base members 16 will have a plurality of orifices 18 arranged at predetermined positions thereon. In the embodiment shown the orifices 18 are arranged along near or at each end thereof. Some of the orifices 18 may be threaded while some of the orifices may not be threaded. However, in some embodiments all orifices 18 may be threaded and in some other embodiments none of the orifices 18 are threaded. The base 16 generally has a rectangular shape with a predetermined thickness. In the embodiment shown three orifices 18 are arranged at or near each end of the base 16. It should be noted that any known shape can be used for the base members 16 depending on the design requirements and space available for the base members 16 on the frame 14. The base members 16 are generally made of a steel material, however it should be noted that any other metal, plastic, ceramic, composite or the like may be used for the base members 16 depending on the robotic cell and the environment such robot will be used in.

Figure 2:
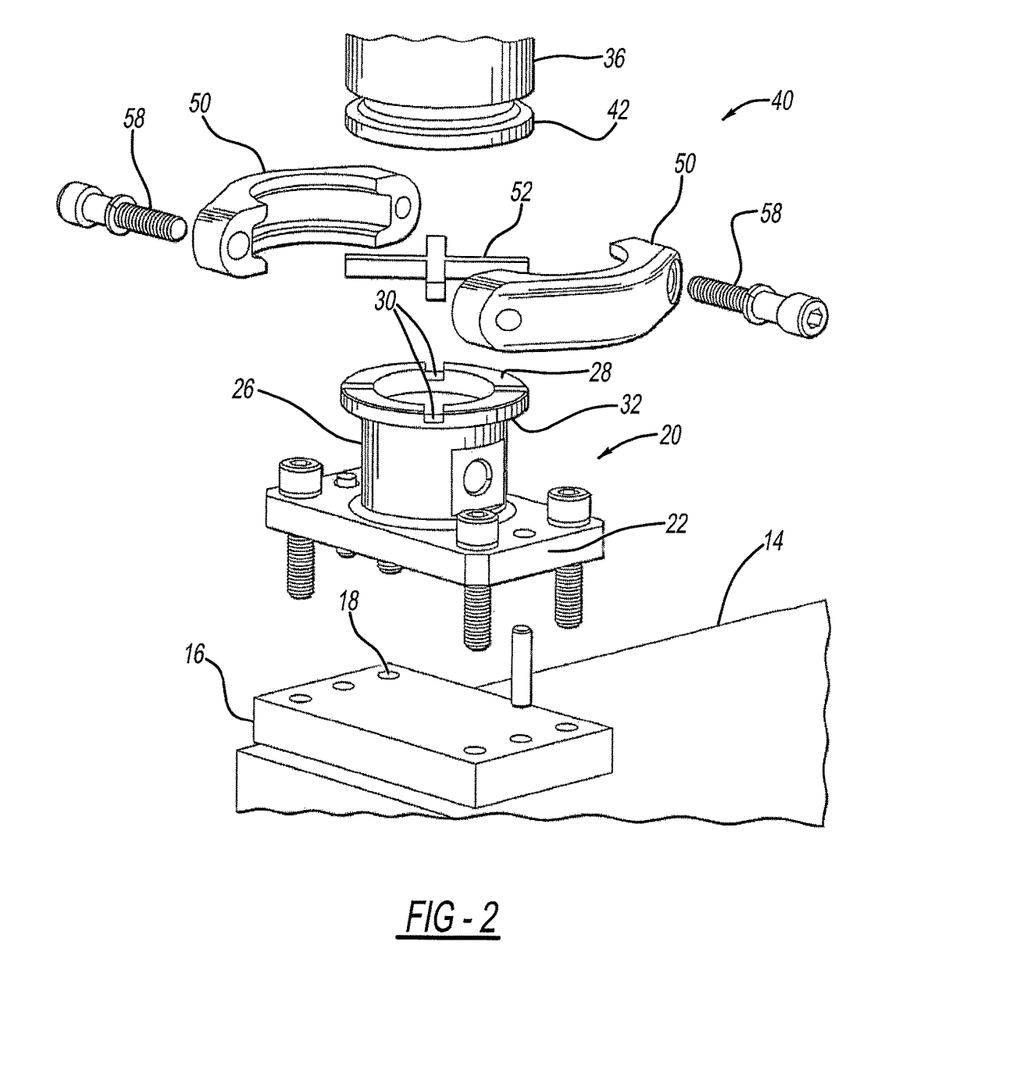
FIG. 2 is an exploded perspective view of a connection.

Secured to the base member 16 is an anchor mount 20. It should be noted that the anchor mount 20 may be secured to all base members 16 on a robot end effector system frame 14 or on just selected base members 16 depending on the components to be connected to the frame 14 of the robot end effector system 10. The anchor mount 20 generally has a base 22 that mimics the shape of the base member 16. The anchor mount base 22 in the present embodiment generally has a rectangular shape with a predetermined thickness. A plurality of orifices 24 are arranged through the thickness of the anchor mount base 22 to align with and mate with the orifices 18 in the frame base member 16.

Extending from generally a midpoint of the anchor mount base 22 on one side thereof is a cylindrically shaped member 26 extending therefrom. The cylindrical member 26 is fastened to the face of the anchor mount base 22 via any known fastening technique, such as welding or the like, or it is also contemplated to have cylindrical member 26 cast with the base 22 as one member, or made as an extrusion or machined. Arranged at an end of the cylindrical member 26 is a circumferential coupling flange 28. The flange 28 has a predetermined diameter with a predetermined sized bore or orifice through a midpoint thereof. A plurality of slots 30 are arranged on the end face of the coupling flange 28. The slots 30 extend a predetermined distance into the face of the flange 28. The slots 30 are arranged on the face such that any number of degrees are located between the slots 30. In the embodiment shown four slots 30 are positioned within the face of the flange 28. The slots 30 are arranged at 90° intervals around the ring like face of the flange 28.

The anchor mount 20 is designed such that a breakaway point 32 occurs generally to where the flange 28 and cylindrical member 26 intersect. This intersectional point 32 between the flange 28 and cylindrical member 26 may be designed by either increasing or decreasing the thickness of the material used at the breakaway point 32 for the anchor mount 20. The reduction of material will create a breakaway point 32 that will fail at a lower force than that of a breakaway point 32 that has a thicker material cross section therethrough. Other methods of creating a breakaway point 32 are also contemplated such as scoring the intersection between the flange 28 and cylindrical member 26, pre-stressing, placing a plurality of notches there along, arranging a plurality of orifices therearound, using a different material, or any other contemplated and known method of creating a breakaway point 32 that will fail at a particular lower force in comparison to other components connected to the anchor mount 20 and within the end effector system 10. The breakaway point 32 will create a specific point at which a predetermined force will break the anchor mount 20 in relation to all other components connected to the anchor mount 20 between the robot and the components being held by the end effector system 10.

Figure 3:
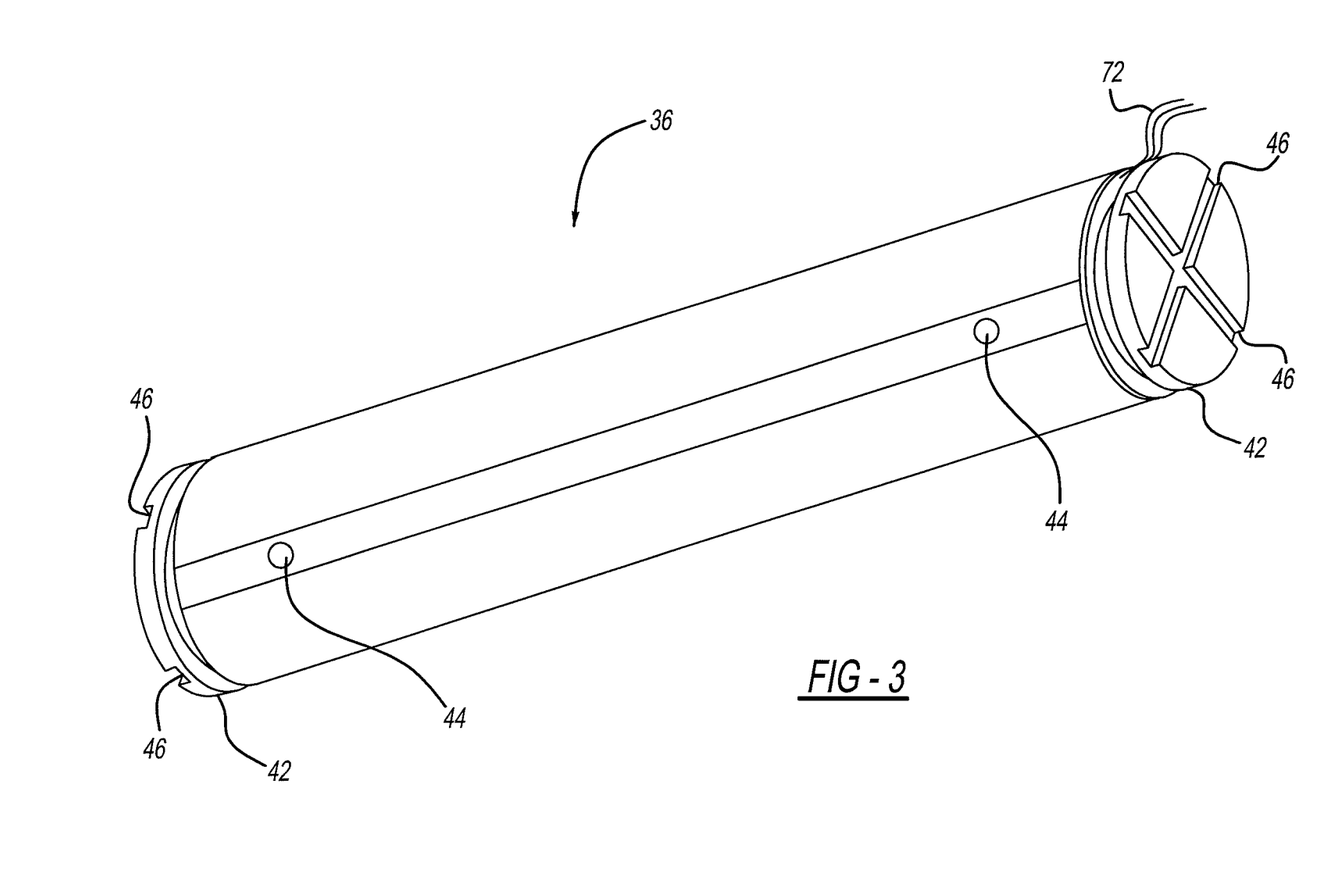
FIG. 3 is a plan view of a boom.

A boom 36 and/or junction member 38 may be secured to the anchor mount 20 via a collar assembly 40. The boom 36 which generally has a cylindrical shape with a bore through an entire longitudinal length thereof. The boom 36 will include a generally circular coupling flange 42 on both ends thereof. The boom 36 can be of any length or incremental length needed within the end effector system 10. The boom 36 will also include a plurality of orifices 44 prearranged at predetermined positions such that accessories may be mounted to the boom 36 or the booms 36 may be connected to components connected thereto or to an anchor mount 20 via a safety harness or the like. The orifices 44 are predetermined size and arranged at predetermined intervals along the boom 36 depending on the design requirements and the components being held. The coupling flange 42 located at each end of the boom 36 have a plurality of slots 46 therein to align with the slots 30 on the anchor mount 20, other junction members 38 or any other components. The slots 46 will have the same positioning around the end of the flange 42 and will have the same predetermined depth as that of the anchor mount flange 28. The boom 36 may have a predetermined thickness thus creating a part that will be able to absorb forces greater than that at the breakaway point 32 of the anchor mount 20.

The junction members 38 generally will have at least one circumferential coupling flange 42 thereon but may have any number of coupling flanges 42 and faces thereon such as two face junction members, three face, four face, five face, or the like. These junction members 38 may allow for a connection to the anchor mount 20 at various angles, or with other various components connected thereto. Each of the faces of the junction members 38 will include a generally circumferential coupling flange 42 having slots 46 that are arranged in the same manner as those discussed for the anchor mount flange 28. Other edge accessory members 48 may also be connected to or used as an end member which connects to a clamp or other component being held by the end effector system 10. Generally, the edge accessory members 48 will have one circumferential coupling flange 42 arranged thereon but more than one may also be used. The flange 42 will include the same slots 46 arranged at the same intervals as those for the anchor mount flange 28. The edge accessory components 48 will be capable of holding parts at predetermined angles and/or straight as shown in FIG. 1.

The boom 36, junction members 38, edge accessory members 48, other components and anchor mounts 20 are all interconnected with each other and fastened to one another in a multitude of combinations. The connections are created via a collar assembly 40. The collar assembly 40 includes a first and second collar member 50 and a cross key 52. The cross key 52 generally has an X-shape with a predetermined thickness. The predetermined thickness will be such that approximately half of the cross key 52 will extend into a slot 30, 46 on any of the coupling flanges 28, 42 while the other half of the cross key 52 will extend into an adjacent coupling flange 28, 42 of the other component being connected thereto The cross key 52 is arranged within all four of the slots 30, 46 and thus will secure the components being connected to one another such that no rotation can occur between the components after they are secured to one another with the collar assembly 40.

Figure 4:
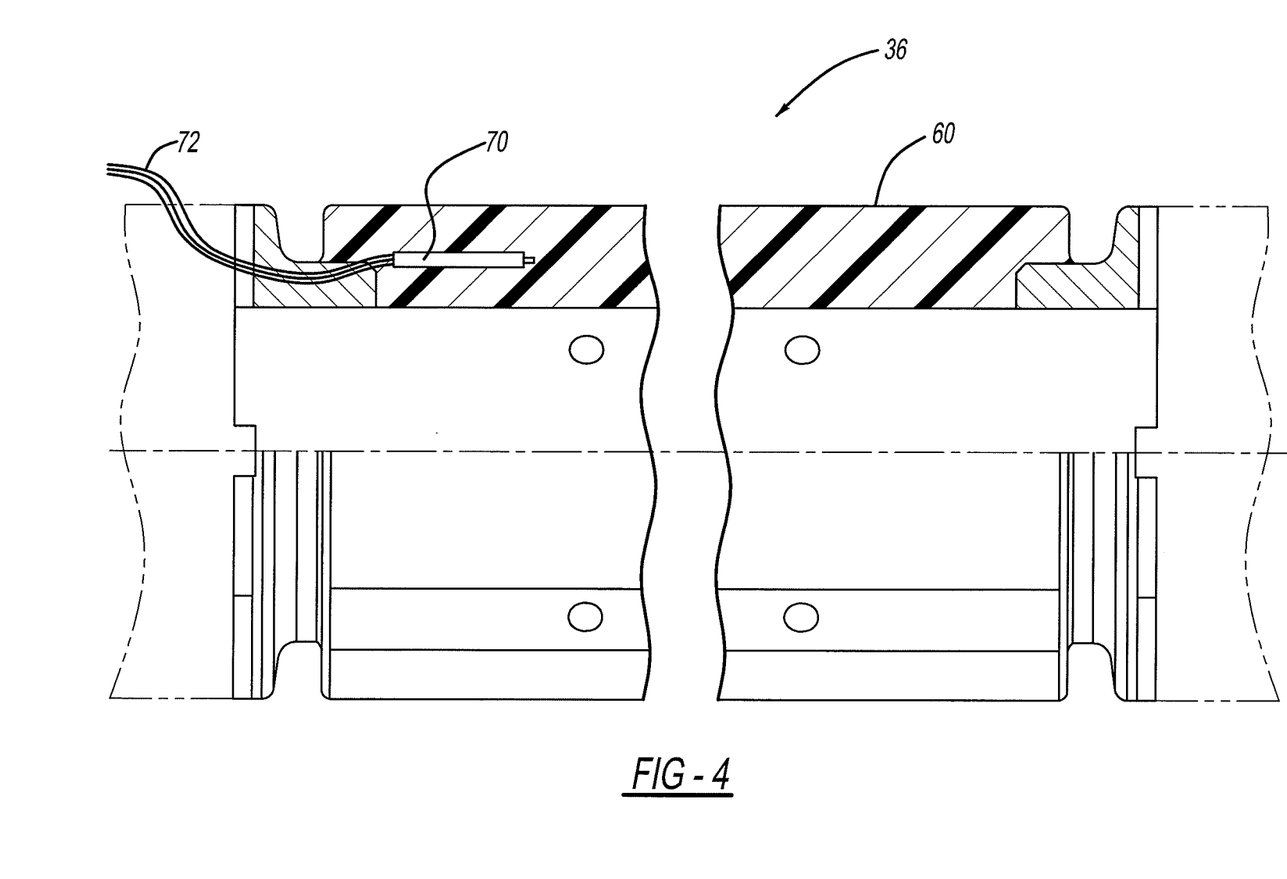
FIG. 4 is a cross-section view of FIG. 3.
Figure 5:
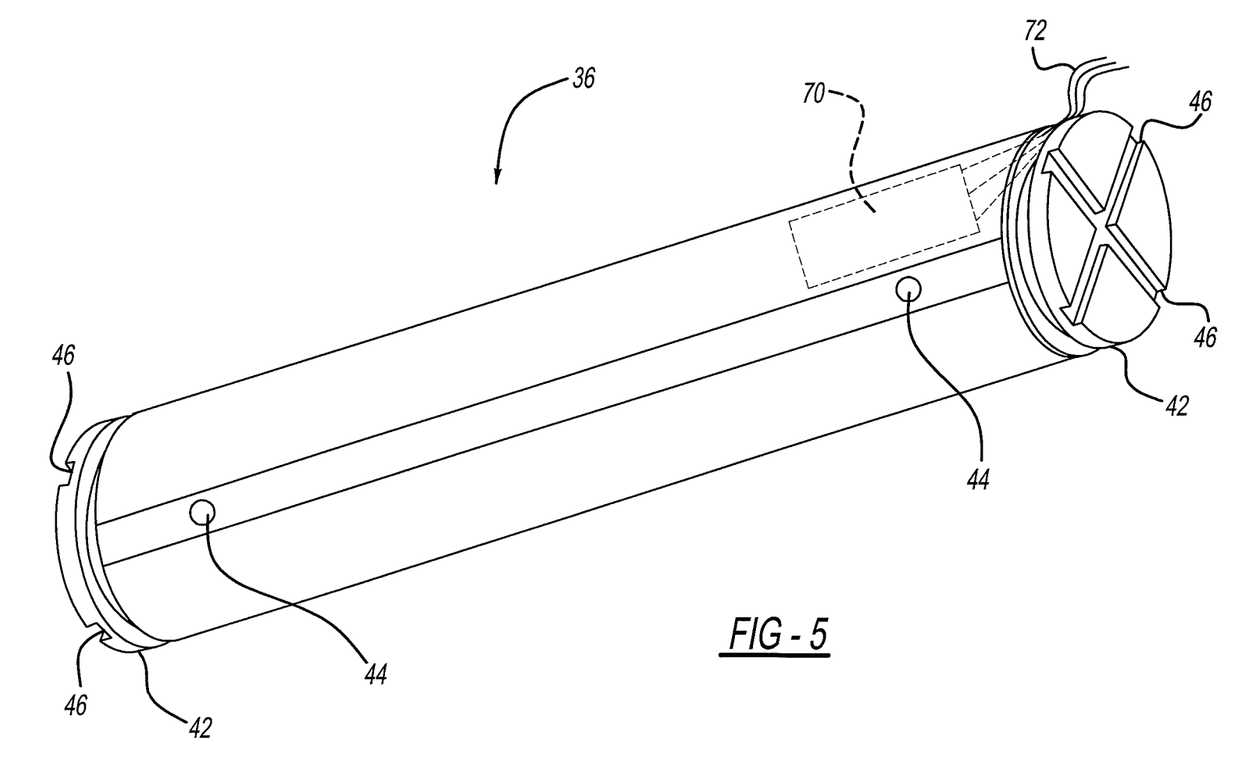
FIG. 5 is a perspective view of the boom.
Figure 6:
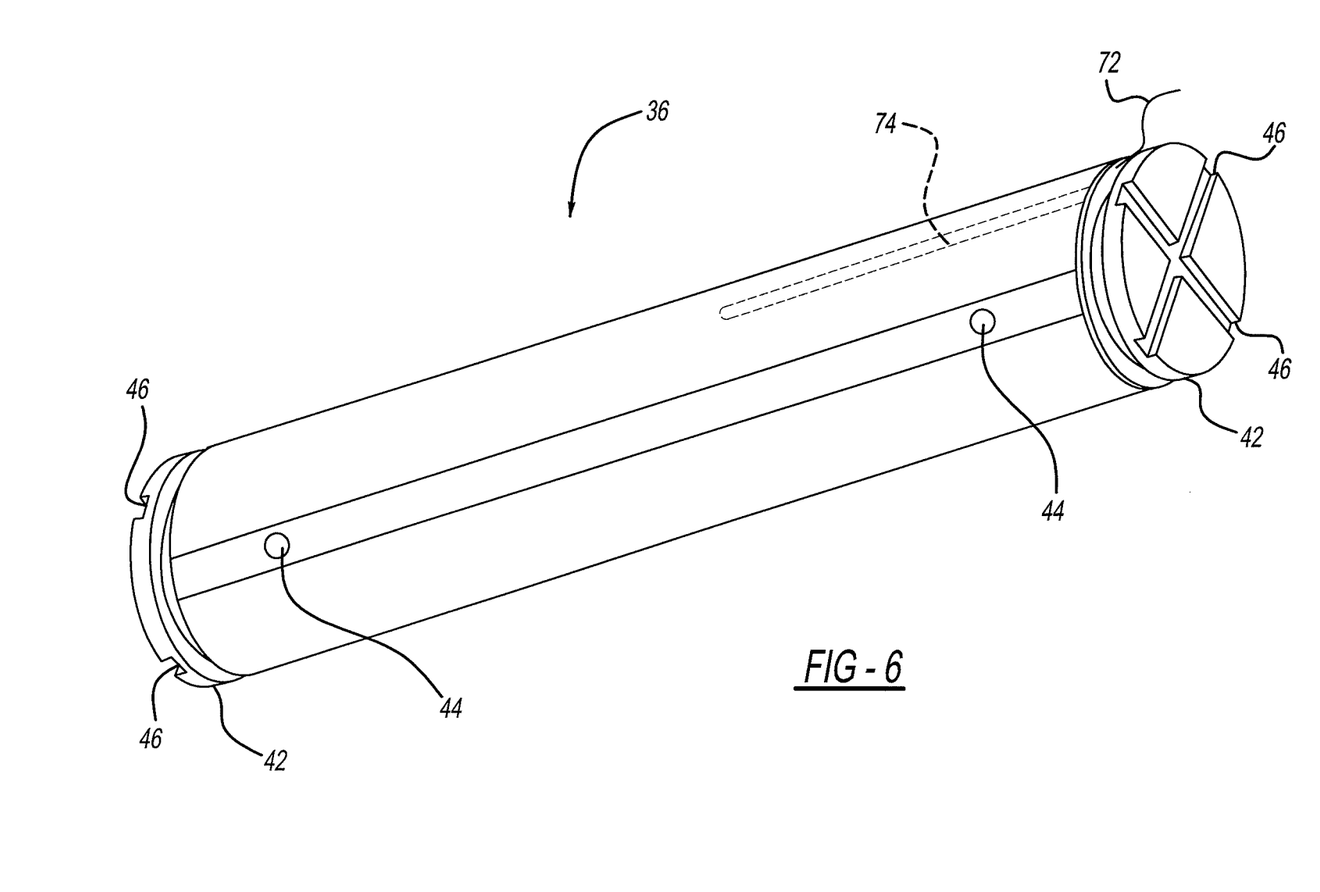
FIG. 6 is a perspective view of the boom of a second embodiment.

The body 60 of the boom 36 is manufactured from a carbon fiber material 62. Additionally, any type of fiber reinforced material may be utilized. A feedback sensing element 70 is molded into the fiber reinforced material 62. The sensing element 70 may be an electric strain gauge, fiber optic cable 74 or the like. The sensing feedback device 70 provides accurate real time information of what is occurring at the jig 76, fixture 78, or end effector 80. This sensing feedback device 70 provides stress and strain of the boom 36 that indicates the deflection and force on the jig, fixture or end effector. This real time determination helps to improve the control of the system 10. Thus, the fiber reinforced boom 36 enables the jigs, fixtures or end effectors to become add-on systems that determine the process and whether or not the operation are functioning satisfactory or if they are out of control. A plurality of wires 72 are connected with the sensing feedback device 70. The wires 72 are coupled with the controller (not shown).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A boom for an end effector utilized in an automated assembly process comprising:
   a cylindrical body including a metallic flange at each end, the body formed from a carbon fiber material, the metallic flanges integrally formed with the cylindrical body;
   an end face on the metallic flanges, the end face is transverse to an axis of the cylindrical body;
   a mechanism on the end face for connection with an end face of a junction member;
   an electronic feedback mechanism embedded in the carbon fiber material and the electronic feedback mechanism transmitting signals to an automated controller that utilizes stress and strain information of the cylindrical body to determine if the automated assembly process is operating satisfactory.

2. The boom of claim 1, wherein the electronic feedback mechanism is a strain gauge.

3. The boom of claim 1, wherein the electronic feedback mechanism is a fiber optic cable.

4. An effector system utilized in an automated assembly process comprising:
   a platform;
   a frame secured to the platform;
   a plurality of bases arranged on the frame;
   an anchor mount secured to at least one of the bases; and
   a component connected to the anchor mount, the component including a boom comprising:
   a cylindrical body including a metallic flange at each end, the body formed from a carbon fiber material, the metallic flanges integrally formed with the cylindrical body;
   an end face on each of the metallic flanges, the end face is transverse to an axis of the cylindrical body;
   a mechanism on the end face for connecting with an end face of a junction member;
   an electronic feedback mechanism embedded in the carbon fiber material and a controller receiving signals from the electronic feedback mechanism for determining if the automated assembly process is operating satisfactory.

5. The boom of claim 4, wherein the electronic feedback mechanism is a strain gauge.

6. The boom of claim 4, wherein the electronic feedback mechanism is a fiber optic cable.

* * * * *

UNITED STATES PATENT AND TRADEMARK OFFICE
CERTIFICATE OF CORRECTION

| | | |
|---|---|---|
| PATENT NO. | : 9,884,426 B2 | Page 1 of 1 |
| APPLICATION NO. | : 14/299297 | |
| DATED | : February 6, 2018 | |
| INVENTOR(S) | : John Smith | |

It is certified that error appears in the above-identified patent and that said Letters Patent is hereby corrected as shown below:

In the Claims

<u>Column 6</u>
Line 1, Claim 1       after "on", insert --each of--.
Line 3, Claim 1       "connection" should be --connecting--.

Signed and Sealed this
First Day of May, 2018

Andrei Iancu
*Director of the United States Patent and Trademark Office*